(12) United States Patent
Jiang

(10) Patent No.: US 6,598,085 B1
(45) Date of Patent: Jul. 22, 2003

(54) ENABLING COMMUNICATIONS BETWEEN WEB SERVERS

(75) Inventor: Tiebing Jiang, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 633 days.

(21) Appl. No.: 09/583,928

(22) Filed: May 31, 2000

(51) Int. Cl.[7] .............................................. G06F 15/16
(52) U.S. Cl. ...................... 709/230; 709/203
(58) Field of Search ................................ 709/203, 230, 709/213, 214, 215, 216, 219; 707/4; 711/147, 148

(56) References Cited

U.S. PATENT DOCUMENTS 6,112,279 A * 8/2000 Wang ........................ 711/119
6,212,565 B1 * 4/2001 Gupta ........................ 709/229
6,311,216 B1 * 10/2001 Smith et al. ................. 709/226

OTHER PUBLICATIONS

Wessels et al, "Internet Cache Protocol (ICP), version 2," Network Working Group, RFC 2186, http://www.geckil.com/~harvest/rfc/rfc2186.txt 9/97.*

Wessels et al, "Application of Internet Cache Protocol (ICP), version 2," Network Working Group, RFC 2187, http://www.geckil.com/~harvest/rfc/rfc2187.txt 9/97.*

* cited by examiner

*Primary Examiner*—Mehmet B. Geckil
(74) *Attorney, Agent, or Firm*—Trop, Pruner & Hu, P.C.

(57) ABSTRACT

The Internet Cache Protocol may be utilized to implement communications between web servers. Distributed service queries may be embedded into Internet Cache Protocol queries directed to other web servers. The web servers may provide responses using the Internet Cache Protocol.

25 Claims, 6 Drawing Sheets

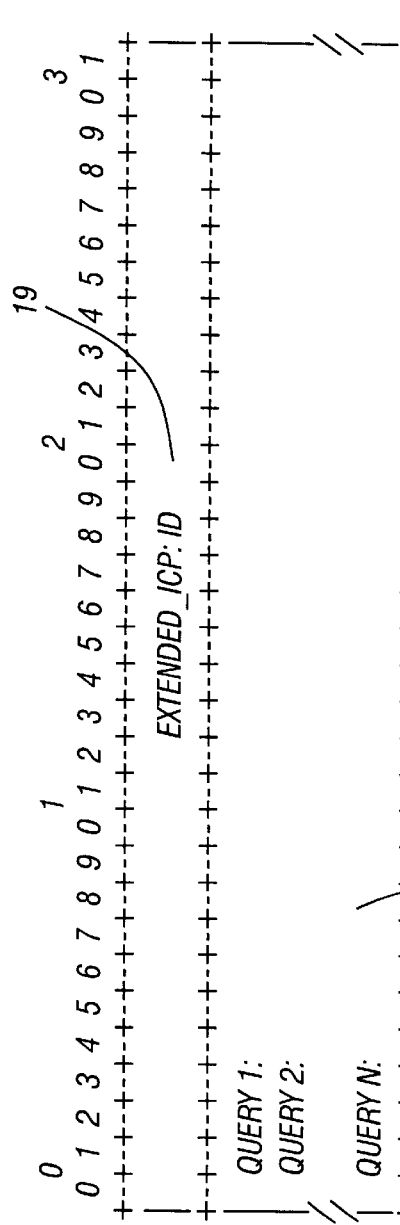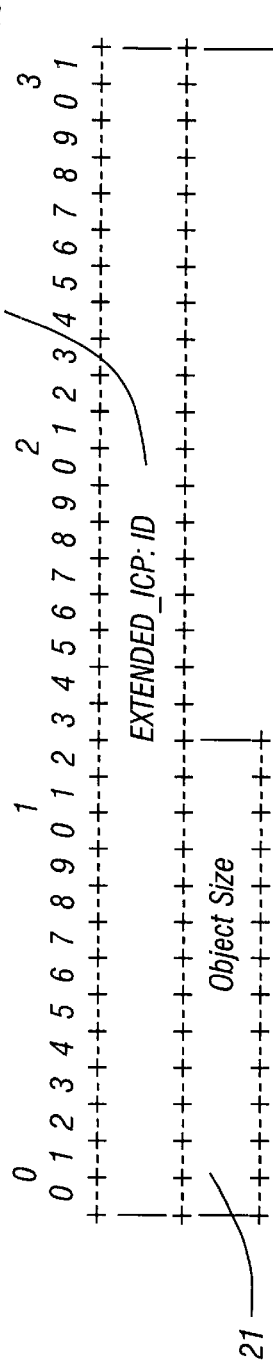

ENABLING COMMUNICATIONS BETWEEN WEB SERVERS

BACKGROUND

This invention relates generally to facilitating communications between web servers and particularly to enabling web servers to make distributed service queries among themselves.

A number of different web servers may all be coupled by a given network such as the Internet. In many cases, one web server knows nothing about what the other web servers are doing. There is generally no easy way to coordinate the services provided by relatively independent web servers.

In a number of cases, it may be desirable to implement communications between web servers. However, if an entirely new protocol were necessary to implement the communications, the need to back fit such a communication protocol to existing web servers may make such a protocol unfeasible.

A first web server may receive a request for services from a given user. However, that user may only be affiliated with a second web server that is coupled to the same network as the first server. To provide distributed services, it will be necessary for the first web server to obtain information about the user from the second web server. If this information could be obtained, distributed services could be provided by a plurality of web servers. Users could then migrate from web server to web server, effectively carrying with them their server credentials. As a result, the first web server, obtaining sufficient information about the user from the second web server, may be willing to grant access to the services offered by first web server.

However, currently there is no way to exchange information between web servers in an efficient fashion. Thus, there is a need for a way to efficiently and inexpensively enable communications between web servers and particularly to enable communications for implementing distributed services by web servers.

BRIEF DESCRIPTION OF THE DRAWINGS

FIG. 3 illustrates an extended Internet Cache Protocol query in accordance with one embodiment of the present invention;

FIG. 4 illustrates an extended Internet Cache Protocol response in accordance with one embodiment of the present invention;

DETAILED DESCRIPTION

Figure 1:
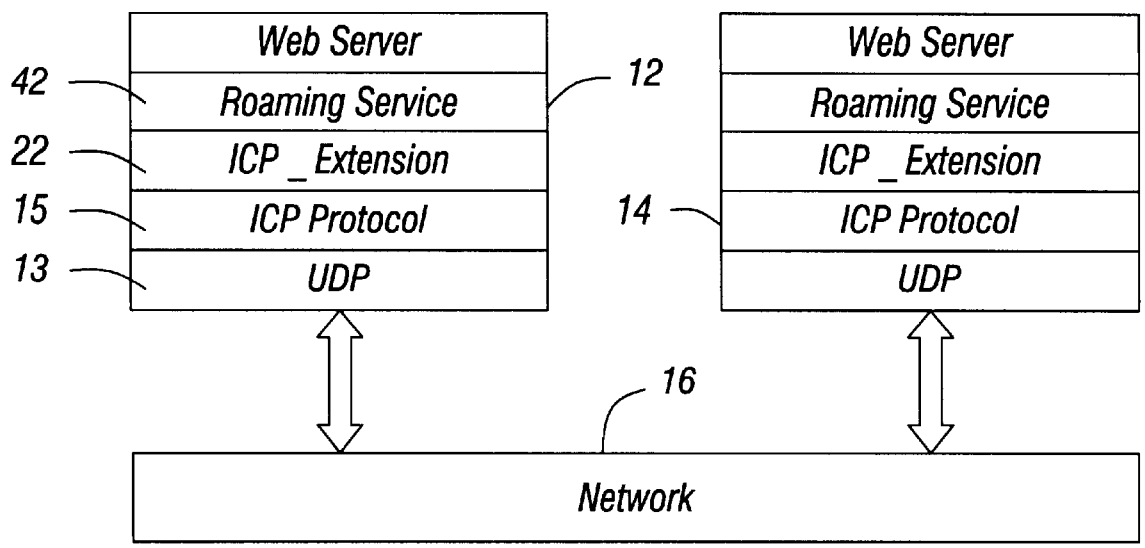
FIG. 1 is a schematic depiction of one embodiment of the present invention.

Referring to FIG. 1, two or more web servers 12 and 14 may be coupled in a network 16 in accordance with one embodiment of the present invention. The network 16 may be the Internet. Each web server 12 or 14 includes a software stack which, at its lowest level, uses the User Datagram Protocol (UDP) 13, in one embodiment of the present invention. See User Datagram Protocol, Request for Comments 768, Information Sciences Institute, Marina Del Rey, Calif. 90291. Other protocols including the Transmission Communication Protocol/Internet Protocol (TCP/IP) may be utilized in other embodiments. See Request for Comments 793 (9/81) and 760 (1/80) prepared by Information Sciences Institute, Marina Del Rey, Calif. 90291.

Above the UDP 13, is the Internet Cache Protocol (ICP) 15. The Internet Cache Protocol was prepared by the Network Working Group, Request for Comments (RFC) 2186 Version 2, September 1997, National Laboratory for Applied Network Research, La Jolla, Calif. 92093. ICP was intended to provide a light weight message format for communications between web caches. ICP is normally used to exchange hints about the existence of uniform resource locators (URLs) in neighbor caches. Cache ICP queries or replies gather information to use in selecting the most appropriate location from which to retrieve an object. In ICP, one cache sends an ICP query to its neighbors. The neighbors send back ICP replies indicating a "hit" or a "miss".

Figure 2:
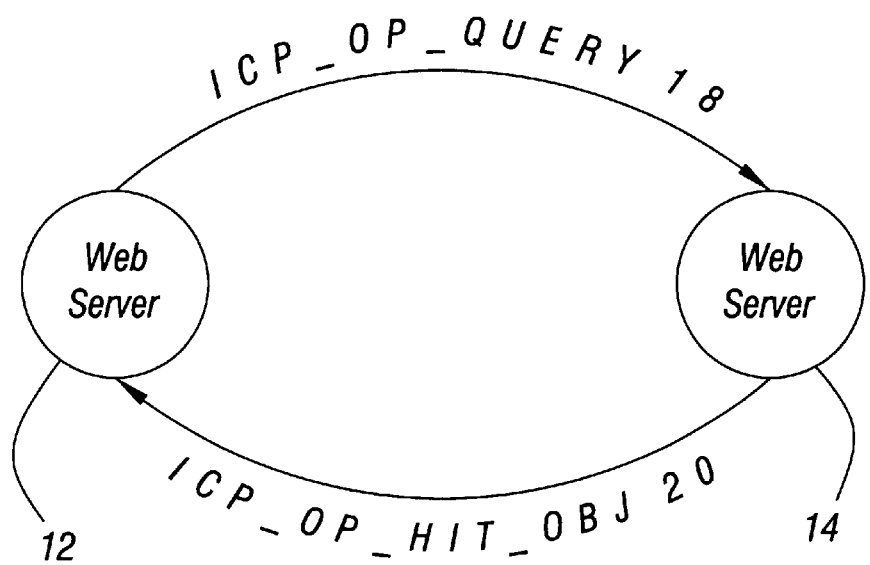
FIG. 2 is a depiction of the interaction between a pair of servers on the same network in accordance with one embodiment of the present invention.

Referring to FIG. 2, a conventional ICP query may be in the form of an ICP_OP_QUERY query 18 from the web server 12 to the web server 14 over the network 16. In response, the web server 14 may provide a ICP_OP_HIT_OBJ response 20.

An ICP_OP_QUERY 18 may include the requester's host address followed by a URL. The requester's host address is not that of a cache entering the ICP message but rather the address of the cache's client that originated the request. Thus, conventionally, under the Internet Cache Protocol, a query may include the requester's host address and a URL.

With the ICP_OP_HIT_OBJ response the actual object data is included in the reply message. Many requested objects are small enough that it is possible to include them in the query response. This avoids the need to make a subsequent hypertext transfer protocol (HTTP) request for the object. ICP provides a relatively limited protocol for enabling cache related inquiries between web servers.

The web servers 12 and 14 also include an ICP_EXTENSION 22, shown in FIG. 1. The ICP_EXTENSION 22 enables communications, such as a distributed service query (DSQ), between web servers unrelated to the existence of a URL in neighbor caches. A DSQ, in accordance with one embodiment of the present invention, is a request for information using the ICP_EXTENSION 22, from one web server to another.

The DSQ, unlike a conventional ICP query, is not related to exchanging information about the existence of a URL in neighbor caches. A distributed service is a service provided from any of a plurality of web servers that can communicate with one another using ICP. A distributed service provided to users who are recognized by one web server but are not recognized by other servers is called a roaming service. A roaming service layer 42 exists above the ICP_EXTENSION 22 in the software stack of the servers 12 and 14. A roaming service enables a user to use credentials established with one service to obtain access to services from another server.

Thus, a DSQ may be made using the established ICP protocol. As a result, it is not necessary to backload a new protocol onto all the existing web servers to implement the communications needed for providing a distributed service such as a roaming service. Instead, the DSQ may be advantageously implemented using ICP, an existing Internet protocol.

Referring to FIG. 3, an ICP_OP_QUERY 18 may be formulated in accordance with the ICP EXTENSION 22. In place of the requester's host address in conventional ICP queries, an identifier (ID) 19 is provided. The ID 19 identifies a particular query made by a particular web server 12 or 14. It may also be utilized in the response to correlate the query and the response. One or more DSQs may be embedded within the payload field 23 that normally contains a URL in conventional ICP message.

A response 20, shown in FIG. 4, to the query 18 may include the identifier 19 that identifies the query 18 being responded to. An object size may be specified in the field 21. The response field 23 includes response information to each DSQ set forth in the payload field 23 of the query 18. In one embodiment, if the returned result is larger than 16K bytes, multiple ICP_OP_HIT_OBJ responses 20 may be returned with the same ID 19 to provide a complete, although sequential, response. Thus, a more voluminous response than that possible in ICP may be achieved by simply providing multiple responses all correlated by the ID 19.

In summary, an ICP_OP_QUERY 18 may have an embedded DSQ in the field 23. The ICP_OP_HIT_OBJ response 20 may have an embedded response in its field 23 to each DSQ set forth in the query 18. The query 18 and response 20 are matched up through the ID 19. The ICP_EXTENSION 22 fully supports ICP but also creates the ICP_OP_QUERY 18 with one or more embedded DSQs that may be sent to other web servers. The ICP_EXTENSION 22 receives and decodes the information in an ICP_OP_HIT_OBJ response 20 from other servers and passes the content back to the requesters.

Figure 5:
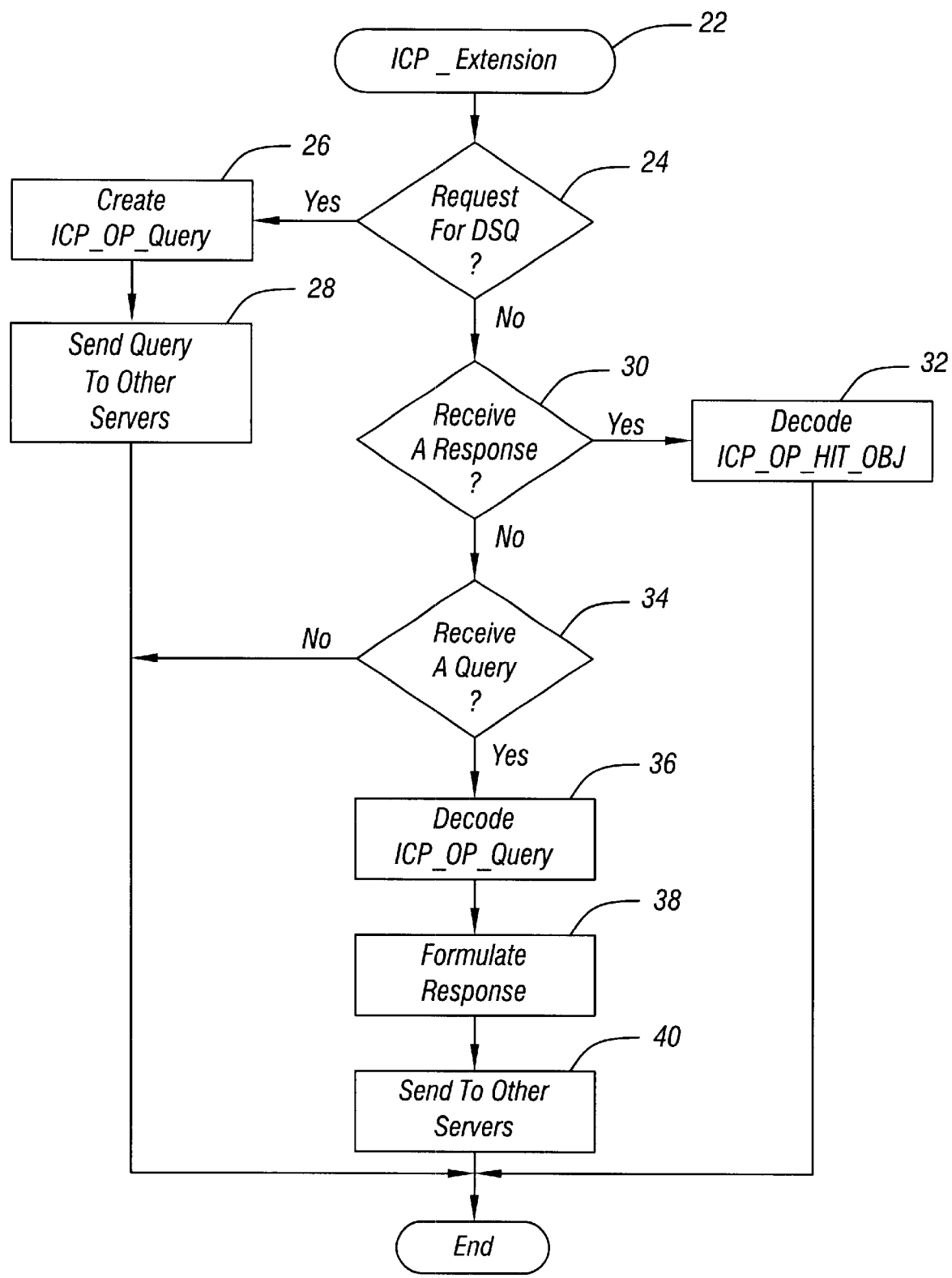
FIG. 5 is a flow chart for an Internet Cache Protocol extension which enables distributed services to be provided in accordance with one embodiment of the present invention.

Turning to FIG. 5, the ICP_EXTENSION 22 begins by determining whether there is a request for a DSQ as indicated in diamond 24. If so, an ICP_OP_QUERY 18 is formulated as indicated in block 26 with an embedded DSQ. The query 18 is then sent to other servers as indicated in block 28.

If a DSQ is not requested, as determined in diamond 24, a check at diamond 30 determines whether or not a response 20 to a query 18 has been received. If so, the ICP_OP_HIT_OBJ response 20 is decoded as indicated in block 32. The web server 12 or 14 determines that the response 20 responds to its query 18 by examining the ID 19.

If a response 20 is not received, as determined in diamond 30, a check at diamond 34 determines whether a query 18 has been received from another web server. If so, that query 18 is decoded as indicated in block 36 to extract the embedded DSQ. The response to the DSQ is formulated as indicated in block 38. Then response is the sent to other servers as indicated in block 40.

Figure 6:
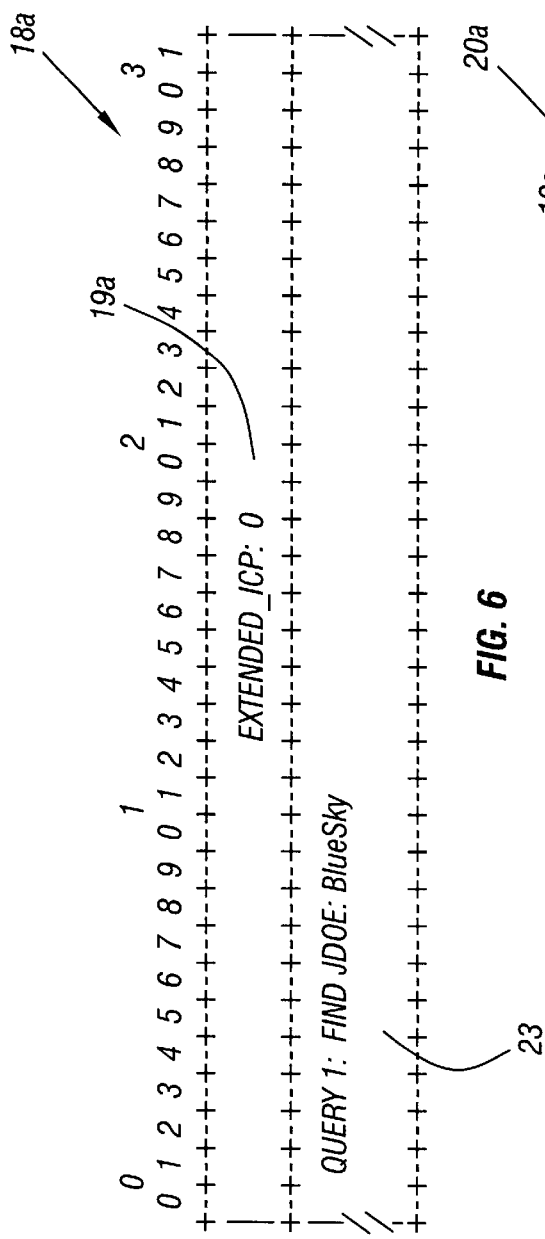
FIG. 6 is a modified Internet Cache Protocol query in accordance with one embodiment of the present invention.

A query 18a, shown in FIG. 6, for implementing a roaming service 42 has a field 19a which identifies the recipient web server by an identifier number (such as zero). Embedded within the query 18a is a roaming query such as find JDOE:BlueSky. In this case, the query 18a is directed to a network web server one by an network web server zero. The query 18a requests information about whether a user identified as JDOE, password BlueSky is in 8good standing on network one.

Figure 7:
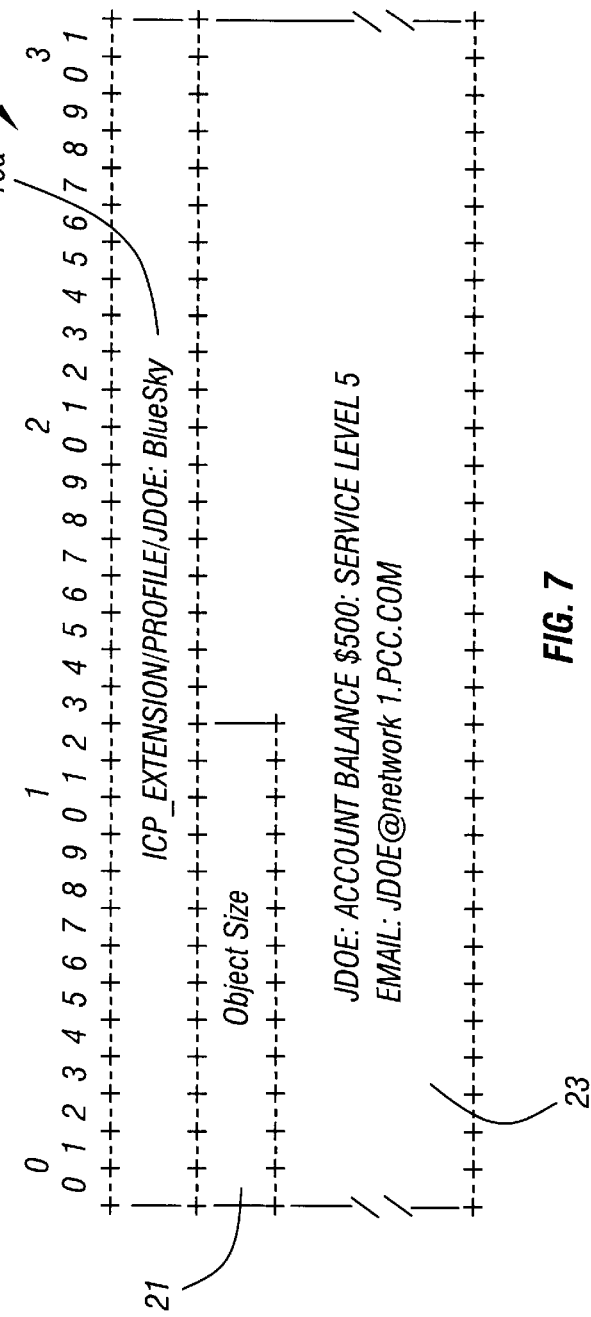
FIG. 7 shows a modified Internet Cache Protocol response in accordance with one embodiment of the present invention.

The response 20a, shown in FIG. 7, identifies a query 18a in the field 19a as PROFILE/JDOE:BlueSky. An object size is included in the field 21 and the response is included in the field 23. Information in a specific format may be provided such as the user's existing balance ($500), his service level (5) and information on contacting the user (e-mail address).

Figure 8:
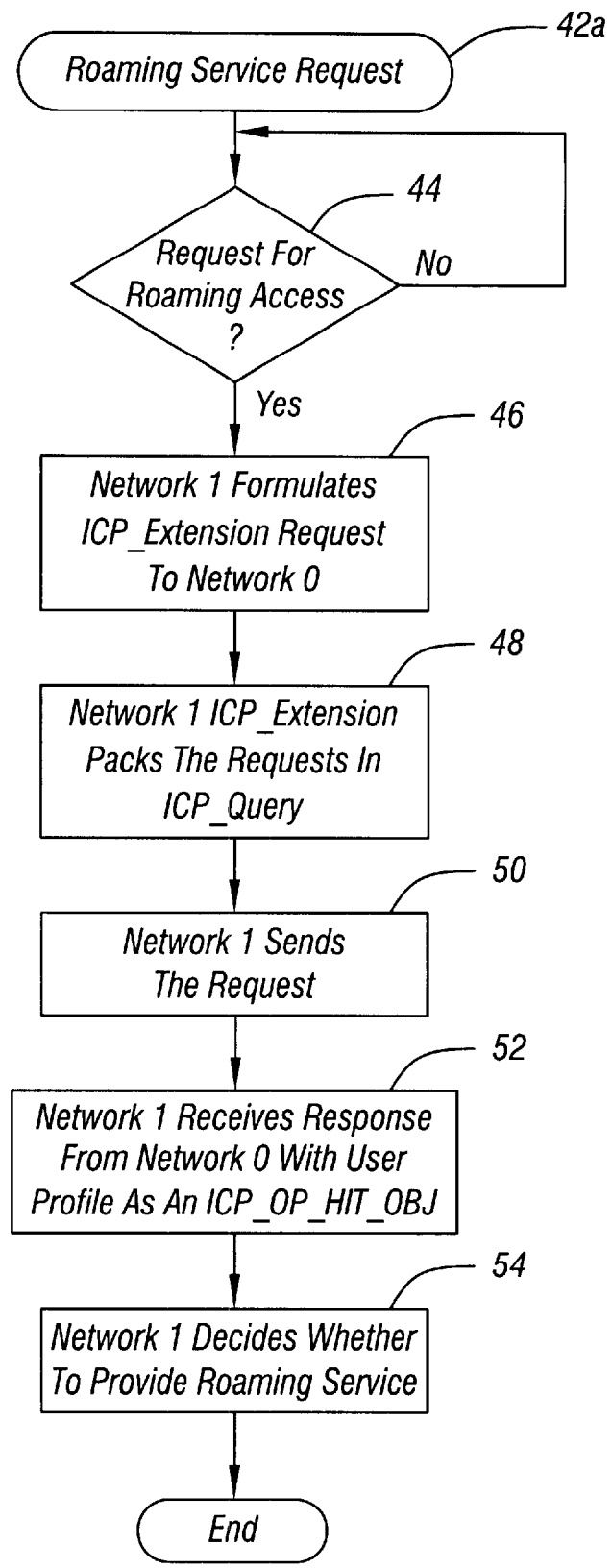
FIG. 8 is a flow chart for software for handling a roaming service request in accordance with one embodiment of the present invention.

Referring to FIG. 8, software 42a for forming a roaming service request begins by determining whether a request for roaming service has been received as indicated in diamond 44. In the illustrated example, a network zero subscriber requests service on network one by providing his login (JDOE) and password (BlueSky).

Network one then formulates an ICP_EXTENSION query 18a (see FIG. 6) to network zero as indicated in block 46. Network one then packs the request in query 18a as indicated in block 48. Network one sends the request to other servers as indicated in block 50.

The network one then receives an ICP_OP_HIT_OBJ response 20a (FIG. 7) from network zero with a user profile, as indicated in block 52. The response 20a provides account balance information, service level information and other information to qualify (or disqualify) the network zero subscriber on network one. The network one then decides whether to provide roaming service to the particular subscriber based on that information, as indicated in block 54.

Figure 9:
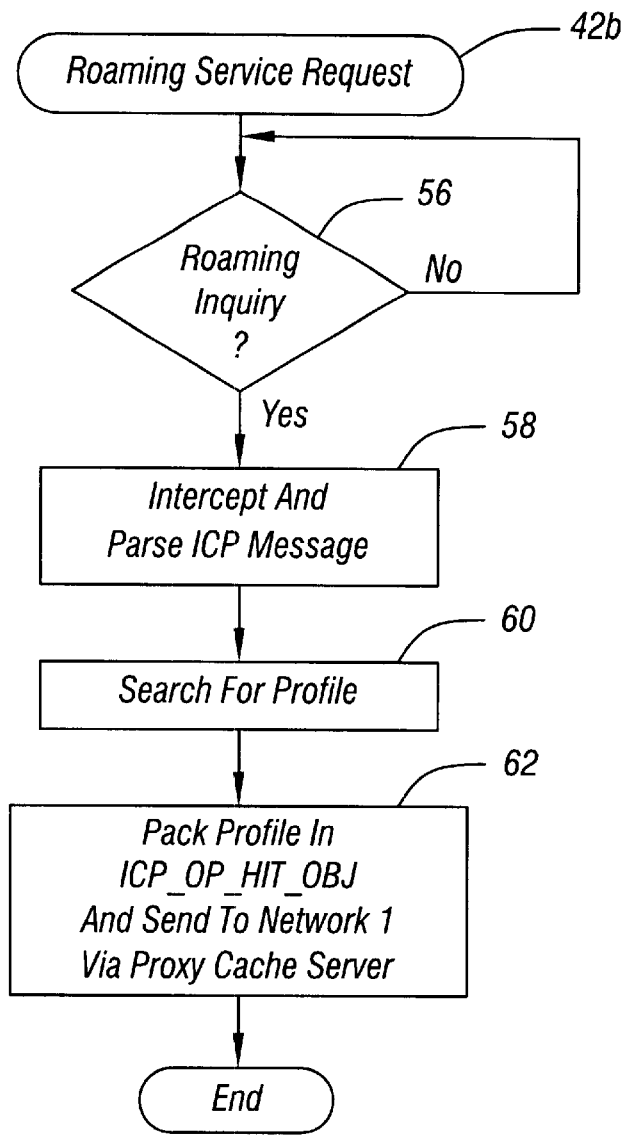
FIG. 9 is a flow chart for software for implementing a roaming service response in accordance with one embodiment of the present invention.

The software 42b for providing a roaming service response 20a, shown in FIG. 9, begins by determining when a roaming service query 18a has been received as indicated in diamond 56. When a query 18a having an identifier 19a is received to by a server, the network zero server intercepts and parses the ICP message as indicated in block 58. The network zero then searches for the subscriber's profile as indicated in block 60. Once the profile is located, the profile is packed in an ICP_OP_HIT_OBJ response 20a under the ICP_EXTENSION 22 and sent to the network one via a proxy/cache server.

Figure 10:
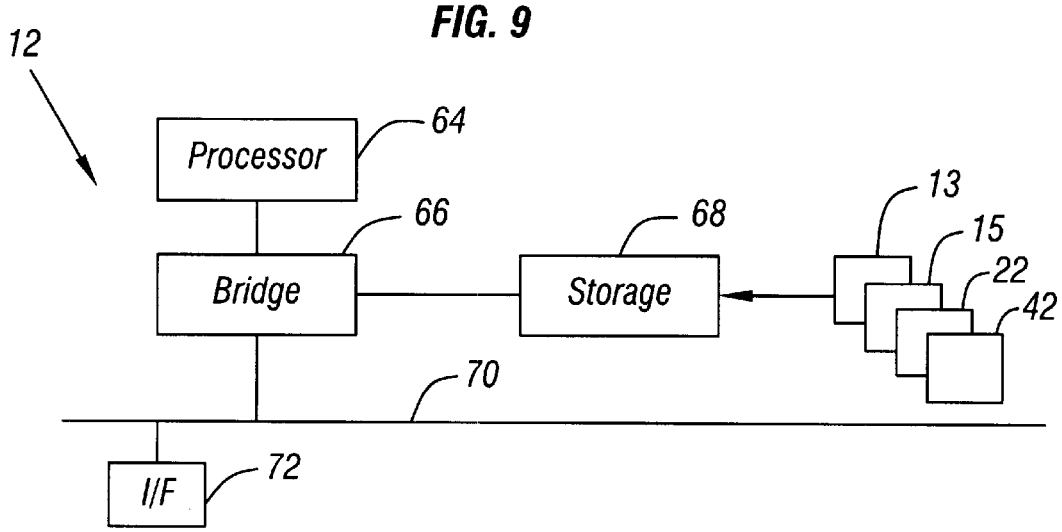
FIG. 10 is a block diagram of one embodiment of the present invention.

Referring to FIG. 10, the web server 12 may include a processor 64 coupled by a bridge 66 to a storage 68. The storage 68 may be a system memory or may be a hard disk drive or any other form of volatile or non-volatile memory. The storage 68 may store the UDP 13, ICP protocol 15, ICP extension 22, and roaming service 42 software. The bridge 66 in turn is coupled to a bus 70 that also couples an interface 72 to the network 16. The interface 72 may be a network interface or a modem as two examples.

With embodiments of the present invention, it is not necessary to create a program running on each server in order to enable the servers to communicate with one another. The development and support of such software is generally time consuming and expensive. With embodiments of the present invention, there is no need to implement special communication software among web servers. This is because ICP is built into the proxy/cache server and the proxy/cache server is already part of the web related service. The ICP implementation in the proxy/cache has been thoroughly tested by numerous production sites. Thus, ICP implements a light weight protocol that is very fast. As a result, distributed services may be achieved by web servers in a relatively short amount of time.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   embedding a distributed service query to a web server in an Internet Cache Protocol query; and
   receiving a response to said distributed service query from said web server embedded in an Internet Cache Protocol response.

2. The method of claim 1 wherein embedding al distributed service query includes embedding said distributed service query into an ICP_OP_QUERY.

3. The method of claim 1 wherein receiving a response to a distributed service query includes receiving a response in the form of an $ICP_{13}$ OP_HIT_OBJ response.

4. The method of claim 1 including providing an identifier, which identifies a particular Internet Cache Protocol query made by a particular web server, in said distributed service query.

5. The method of claim 1 including receiving a distributed service query and preparing a response to said distributed service query by embedding the requested information into an ICP_OP_HIT_OBJ response.

6. The method of claim 1 including embedding a distributed service query to a first web server that requests information about the status of a particular user on said first web server in order to determine on a second web server whether to provide services to said user.

7. The method of claim 6 including providing credit history information for a particular user in response to a distributed service query.

8. The method of claim 1 further including deciding whether to provide service to a given user based on the response to said distributed service query from said web server.

9. The method of claim 1 including using a identifier field to address said distributed service query to said web server.

10. The method of claim 9 including searching for a user profile on said web server.

11. The method of claim 10 including packing said user profile in a predetermined format in an ICP_OP_HIT_OBJ response to said distributed service query.

12. An article comprising a medium storing instructions that enable a processor-based system to:
   embed a distributed service query to a web server in an Internet Cache Protocol query; and
   receive a response to a distributed service query from said web server embedded in an Internet Cache Protocol response.

13. The article of claim 12 further storing instructions that enable the processor-based system to embed said distributed service query into an ICP_OP_QUERY.

14. An article of claim 12 further storing instructions that enable the processor-based system to receive a response in the form an ICP_OP_HIT_OBJ response.

15. The article of claim 12 further storing instructions that enable the processor-based system to provide an identifier which identifies a particular Internet Cache Protocol query made by a particular web server, in said distributed service query.

16. The article of claim 12 further storing instructions that enable the processor-based system to receive a distributed service query and prepare a response to said distributed service query by embedding the requested information into an ICP_OP_HIT_OBJ response.

17. The article of claim 12 further storing instructions that enable the processor-based system to embed a distributed service query to a first web server and request information about the status of a particular user on said first web server in order to determine on a second web server whether to provide services to said user.

18. The article of claim 17 further storing instructions that enable the processor-based system to provide credit history information for a particular user in response to a distributed service query.

19. The article of claim 12 further storing instructions that enable the processor-based system to decide whether to provide service to a given user based on the response to said distributed service query from said web server.

20. The article of claim 12 further storing instructions that enable the processor-based system to use an identifier field to address said distributed service query to said web server.

21. The article of claim 20 further storing instructions that enable the processor-based system to search for a user profile on said web server.

22. The article of claim 21 further storing instructions that enable the processor-based system to pack said user profile in a predetermined format in an ICP_OP_HIT_OBJ response to said distributed service query.

23. A web server comprising:
   a processor;
   a storage coupled to said processor storing an Internet Cache Protocol and an Internet Cache Protocol extension, said extension enabling distributed service queries to be sent by said web server to other web servers and to receive responses to distributed service queries from other web servers.

24. The system of claim 23 wherein said storage further stores roaming service software that enables said server to access information about users of other web servers.

25. The system of claim 23 wherein said storage further stores instructions that enable said system to search for a user profile.

* * * * *

UNITED STATES PATENT AND TRADEMARK OFFICE
CERTIFICATE OF CORRECTION

PATENT NO.     : 6,598,085 B1
DATED          : July 22, 2003
INVENTOR(S)    : Tiebing Jiang It is certified that error appears in the above-identified patent and that said Letters Patent is hereby corrected as shown below:

Column 5,
Line 14, "al" should be -- a --;
Line 19, "ICP13OP_HIT_OBJ" should be -- ICP_OP_HIT_OBJ --.

Signed and Sealed this

Eleventh Day of November, 2003

JAMES E. ROGAN
*Director of the United States Patent and Trademark Office*